(12) United States Patent
Mazzocco et al.

(10) Patent No.: US 10,214,074 B2
(45) Date of Patent: Feb. 26, 2019

(54) SERVO LOCKING SNAP FEATURE

(71) Applicants: DENSO International America, Inc., Southfield, MI (US); DENSO CORPORATION, Kariya, Aichi-pref. (JP)

(72) Inventors: Nicholas Mazzocco, Clawson, MI (US); Daniel Okray, St. Clair Shores, MI (US); Christopher Wisniewski, Ann Arbor, MI (US); Kurt Schulz, Redford, MI (US)

(73) Assignees: DENSO International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 1192 days.

(21) Appl. No.: 14/057,240

(22) Filed: Oct. 18, 2013

(65) Prior Publication Data

US 2015/0111482 A1 Apr. 23, 2015

(51) Int. Cl.
*B60H 1/00* (2006.01)
(52) U.S. Cl.
CPC .... *B60H 1/00521* (2013.01); *Y10T 29/49895* (2015.01)
(58) Field of Classification Search
CPC ................................. B60H 1/00; B60H 1/0052
USPC ....................................................... 454/152
See application file for complete search history.

(56) References Cited

U.S. PATENT DOCUMENTS

| | | | | |
|---|---|---|---|---|
| 6,083,099 A * | 7/2000 | Brown | ............... | B60H 1/00028 165/43 |
| 7,431,638 B2 * | 10/2008 | Natsume | ............ | B60H 1/00692 137/614.11 |
| 7,703,730 B2 * | 4/2010 | Best, Jr. | .................... | F01P 3/18 165/41 |
| 7,793,706 B2 * | 9/2010 | Archibald | .......... | B60H 1/00064 165/202 |
| 8,784,166 B2 * | 7/2014 | Mazzocco | .......... | B60H 1/00592 454/155 |
| 9,067,474 B2 * | 6/2015 | Mazzocco | ................ | F16H 19/08 |
| 2005/0279489 A1 * | 12/2005 | Kushner | .............. | B60H 1/0005 165/203 |
| 2012/0199776 A1 | 8/2012 | Kreuter | | |
| 2013/0306298 A1 * | 11/2013 | Rothenhauser | ......... | F24F 13/14 165/204 |

* cited by examiner

*Primary Examiner* — Steven B McAllister
*Assistant Examiner* — Samantha Probst
(74) *Attorney, Agent, or Firm* — Harness, Dickey & Pierce, P.L.C.

(57) ABSTRACT

Disclosed is a vehicle HVAC system that provides for installation, serviceability, or replacement of at least one actuator servo without removal of the HVAC assembly from the vehicle. As due to the tight space limitations, the present invention provides for at least one fastener-less mounting element of the servo assembly to be attached to the HVAC assembly, without the need for additional fasteners which would require additional space to access with a tool.

8 Claims, 6 Drawing Sheets

SERVO LOCKING SNAP FEATURE

This present invention relates to the field of automotive heating ventilating and air conditioning (HVAC) systems, more specifically this invention relates to attaching a servo assembly to the HVAC housing.

BACKGROUND

This section provides background information related to the present disclosure which is not necessarily prior art.

In automotive vehicles, it is common to have a climate control system (commonly known as an HVAC system) located within an instrument panel which provides heated or cooled air to occupants through dash panel defrost air outlets, instrument panel venting air outlets and floor directed air outlets. These HVAC systems typically comprise at least one door for directing the flow of air throughout the system. These doors are often controlled by one or more actuator servo motors, which provide a means of rotating the doors either directly or indirectly by means of one or more linkages. Due to the space constraints of modern vehicles, it is becoming more and more critical to utilize all space within the instrument panel, and therefore design the HVAC system to conform to the space constraints provided therefore.

Typically, the HVAC main assembly is assembled prior to initial installation within the vehicle. This provides the easies means of installation within the space provided, but the downside to this, is in the event that service to one or more components is needed (such as the servo motor), it is often required to remove the entire HVAC assembly from the vehicle before servicing the servo, due to the inability or extreme difficulty in accessing all of the mounting fastener which attaches the servo assembly to the HVAC case.

It would therefore be desirable to have an automotive HVAC system which provides an easily attachable/removable servo assembly, without the need to remove the entire HVAC assembly from the vehicle.

SUMMARY

This section provides a general summary of the disclosure, and is not a comprehensive disclosure of its full scope or all of its features.

The present disclosure is directed to a vehicle HVAC system that provides for installation, serviceability, or replacement of at least one actuator servo without removal of the HVAC assembly from the vehicle. As due to the tight space limitations, the present invention provides for at least one fastener-less mounting element of the servo assembly to be attached to the HVAC assembly, without the need for additional fasteners which would require additional space to access with a tool such as a screwdriver or socket wrench.

The HVAC case comprises at least one servo pivot pin receiving recess, and at least two fastener-less attachment means located around the pivot pin receiving recess. Each fastener-less attachment means comprises a ramp and deflectable locking tab located on the HVAC case, and oriented in the similar direction of rotation around the pivot pin receiving recess. The servo assembly further comprises a pivot pin and at least two corresponding servo assembly ears which are rotatably received under a corresponding locking tab of the HVAC case once the pivot pin is received in the servo pin receiving recess. And the servo assembly is rotated into locking position. Once secured, the servo assembly is thereby inhibited from further rotational, lateral, or vertical movement in relation to the HVAC case. In the event that removal and service of the servo assembly is desired, the servo can be rotated in the opposite direction to its installation direction, while simultaneously applying upward force on the locking tab(s) thereby allowing for removal of the ears from under the locking tabs as the servo assembly is counter rotated.

In at least one embodiment, the servo assembly further comprises a third ear, through which a standard fastener may be located, securing the servo assembly to a corresponding receiving aperture in the HVAC case. This third ear is specifically positioned so that removal of the fastener may be accomplished with standard tools and without the need for removing the HVAC assembly from the vehicle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
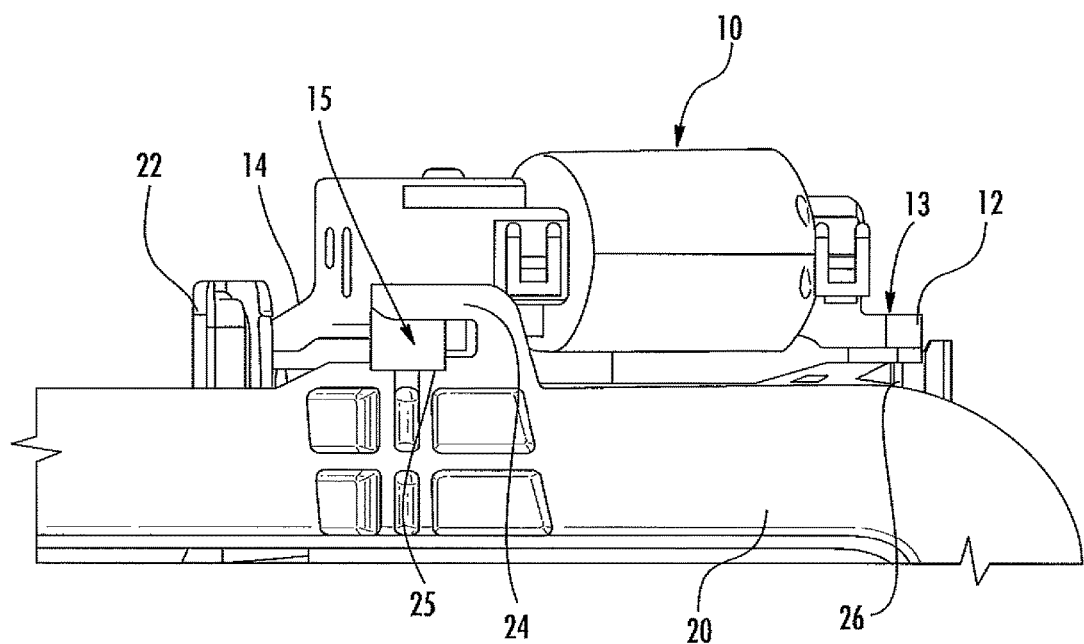
FIG. 1 is a side view depicting a primary embodiment of a fastener-less actuator servo assembly securing means secured to an HVAC housing.

Example embodiments will now be described more fully with reference to the accompanying drawings. The following description is merely exemplary in nature and is not intended to limit the present disclosure, application, or uses. It should be understood that throughout the drawings, corresponding reference numerals indicate like or corresponding parts and features.

Figure 2:
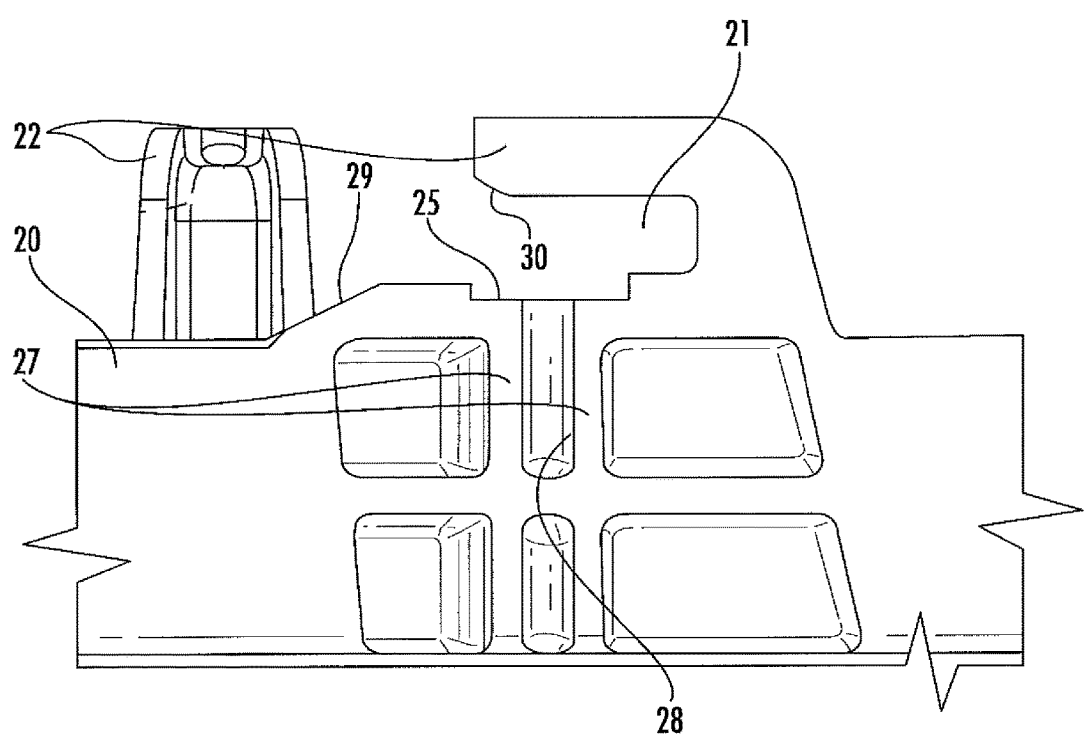
FIG. 2 is a partial side view of the fastener-less servo assembly securing means of the HVAC housing.
Figure 3:
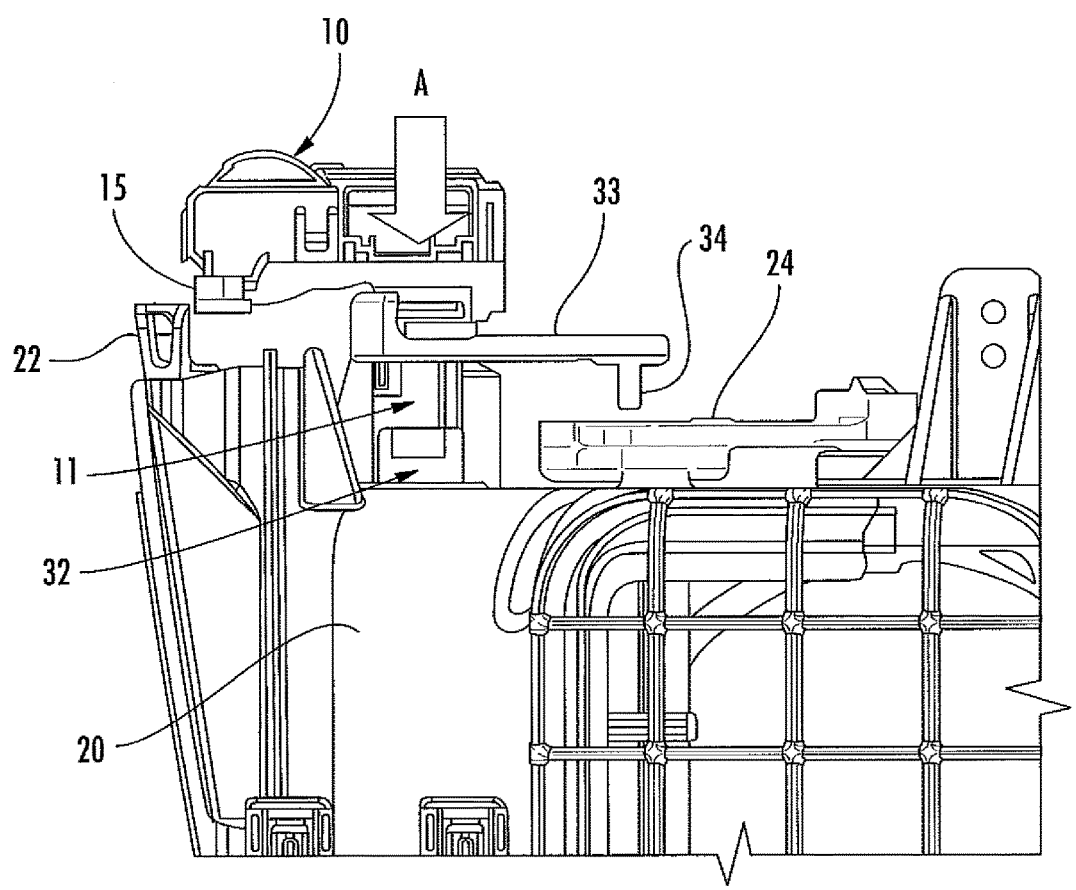
FIG. 3 is a partial side view of the servo assembly securing means during the first step of attachment to the HVAC housing.

Referring to the figures, in particularly FIGS. 1-3, a HVAC servo mounting system comprising the primary embodiment of the present disclosure is shown. The servo assembly comprises a servo motor 10, attached to a servo assembly 14 for attaching to an HVAC housing 20. The servo assembly 14 comprises at least two fastener-less attachment ears 15 extending generally planarly from the servo assembly 14 and positioned around the servo motor 10 of the servo assembly 14. each attachment ear 15 has a through aperture 16, centered at a distal portion of the ear, of which will be described later. A third attachment ear 12 having an aperture 13 there through is also extending generally coplanar from the servo assembly 14 as the fastener-less attachment ears 15. The servo assembly 14 further comprises a pivot pin 11, positioned on a bottom side thereof and located centrally between the fastener-less attachment ears 15 and the third attachment ear 12.

The HVAC housing 20 which receives the servo assembly 14 comprises two J-shaped locking tabs 22 integrated therein, corresponding to each fastener-less mounting ear 15 of the servo assembly 14. Positioned below each locking tab 22 is a recess 25, which receives a lower extending portion of the fastener-less mounting ear 15 of the servo assembly 14 in a locking manner when fully attached sop as to prevent any further rotational, vertical or lateral movement of the servo assembly 14.

Figure 4A:
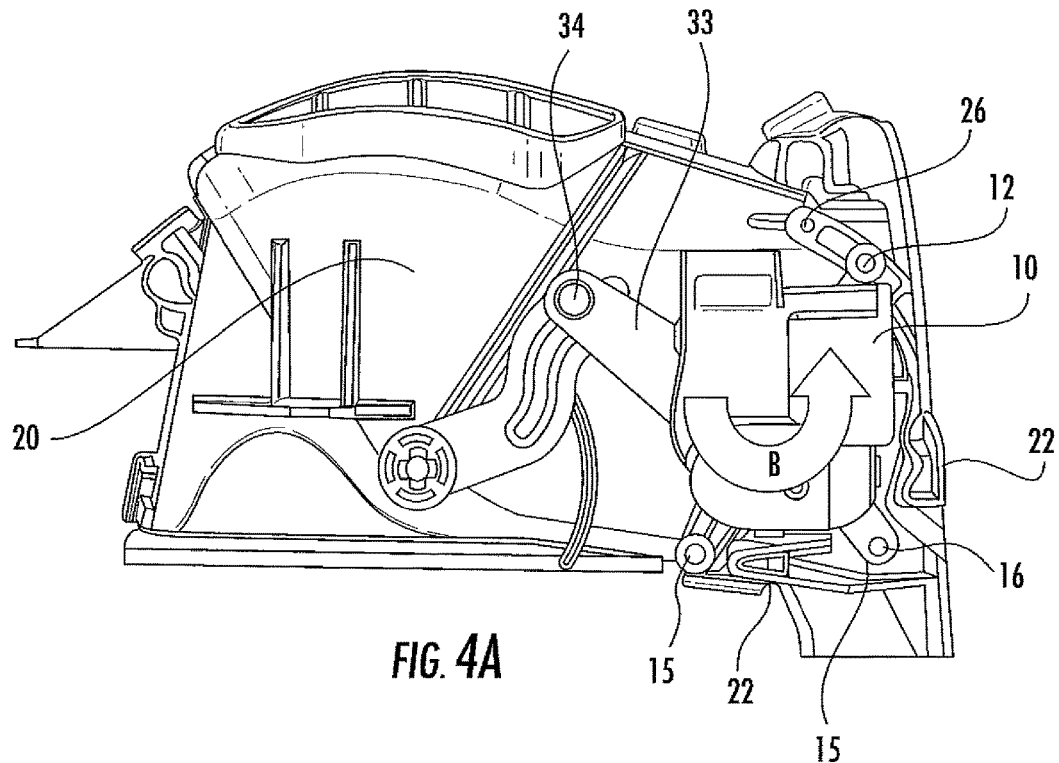
FIG. 4A is a partial overhead view of the servo assembly securing means during the second step of attachment to the HVAC housing.
Figure 4B:
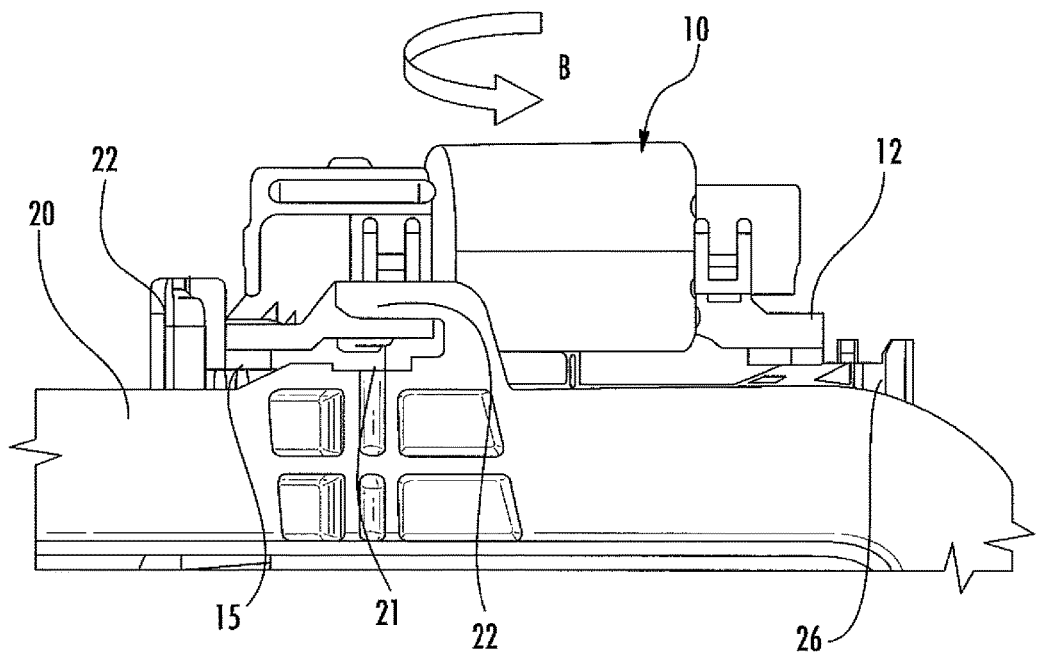
FIG. 4B is a partial side view of the servo assembly securing means during the second step of attachment to the HVAC housing.

Positioned directly below each recess 25, is a pair of walls 27 which define a cavity 28 to be described in detail later. Adjacent to the recess 25, is an inclined ramp feature 29, leading up from the surface of the HVAC housing 20 to a generally planar portion surrounding each recess 25. HVAC housing 20 further comprises a similar ramp 26 correlating to the third attachment ear 12 of the servo assembly 14, having an additional aperture in the HVAC housing 20 (as can be seen in FIG. 4A).

Each of the ramp features 29 and the ramp 26 are oriented in the same general direction around a pivot pin receiving recess 32 as shown in FIG. 3. The orientation of the ramp features 29 and ramp 26 may be either clockwise or counterclockwise depending on the application, but for this example they are shown in a counter-clockwise orientation.

The servo assembly 14 further comprises a servo arm 33 positioned around pivot pin 11, the servo arm 33 having a pin 34 at a distal end, of which when assembled to the HVAC housing 20, is received in servo linkage 24 attached to the HVAC housing 20 for controlling the one or more doors within the HVAC assembly.

Now referring to FIGS. 3-6B, the attachment of the servo assembly 14 to the HVAC housing 20 will be described in order. As illustrated in FIGS. 3 and 4A, the servo assembly 14 is positioned directly above its mounting location on the HVAC housing 20. In this position, the pivot pin 11 of the assembly is positioned directly above the pivot pin receiving recess 32 of the HVAC housing. The servo arm pin 34 is positioned above its receiving location in the linkage 24 of the HVAC housing, each fastener-less mounting ear 15 is positioned proximal the lower side of its corresponding ramp 29, and third attachment ear 12 is positioned proximal the lower side of ramp 26.

Once properly aligned, the assembly is lowered vertically into position as shown by arrow A in FIG. 3, so as pivot pin receiving recess 32 fully receives pivot pin 11 of the servo assembly, and servo arm pin 34 is located in its receiving location within linkage 24, assuring proper alignment is achieved. Once the proper alignment is confirmed, the servo assembly 14 is rotated counter clockwise as indicated by arrow B in FIGS. 4A and 4B until the lower portion of fastener-less mounting ear 15 contacts ramp 29 and the lower portion of the third attachment ear 12 contacts ramp 26.

Figure 5A:
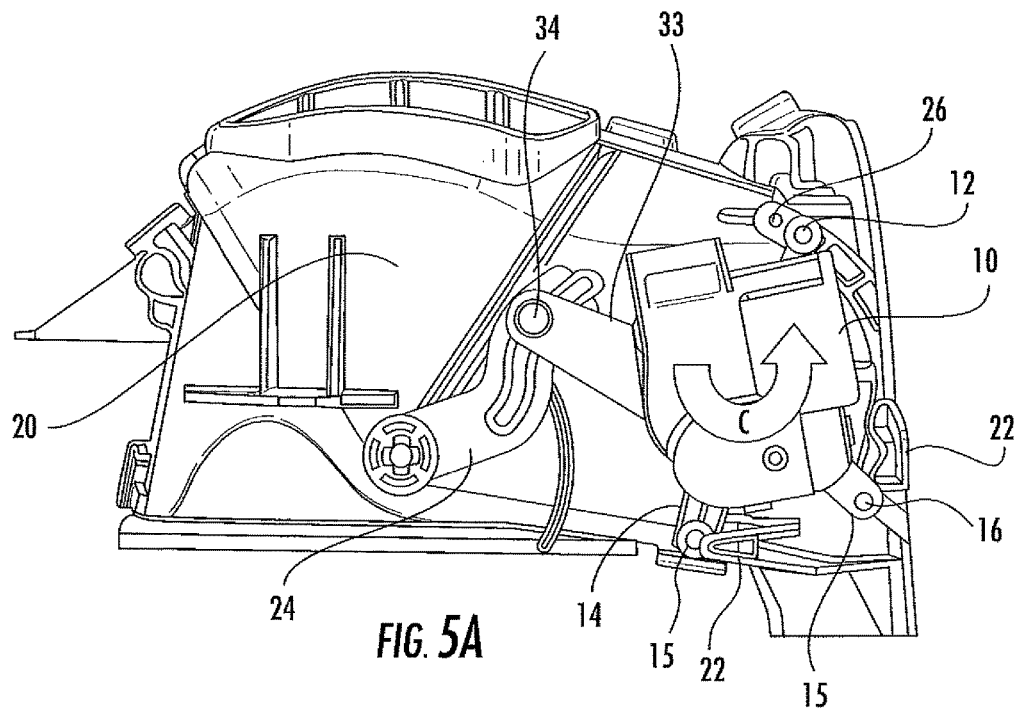
FIG. 5A is a partial overhead view of the servo assembly securing means during the third step of attachment to the HVAC housing.
Figure 5B:
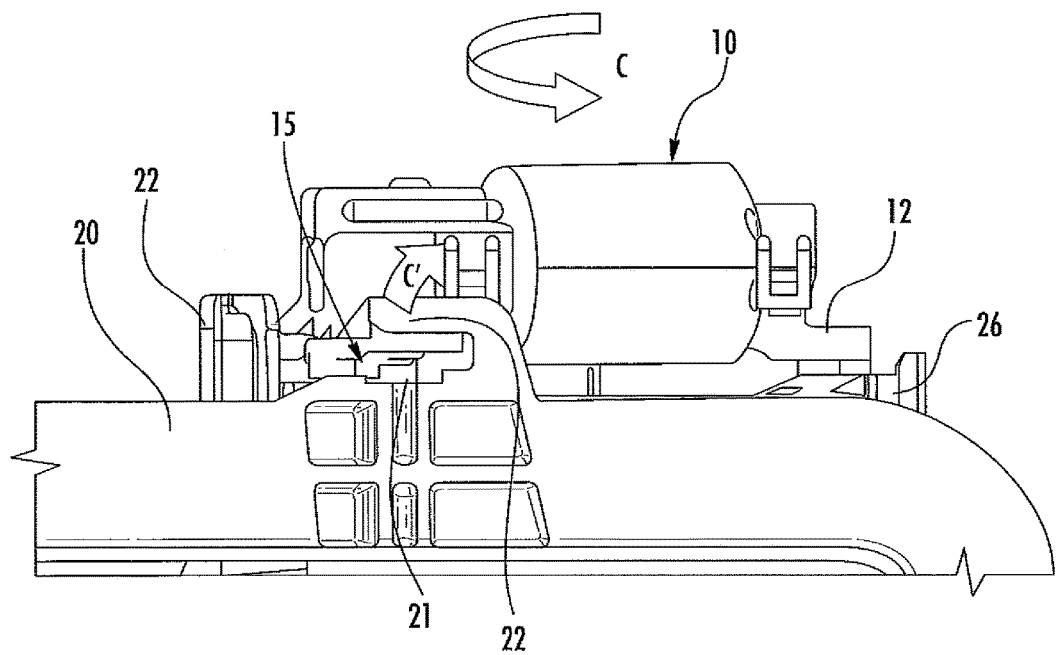
FIG. 5B is a partial side view of the servo assembly securing means during the third step of attachment to the HVAC housing.

As the servo assembly 14 is further rotated counter clockwise, while maintaining slight downward pressure, the ramps 29 and ramp 26 cause upward deflection of mounting ears 15 and third attachment ear 12 respectively as the lower portions of the ears 15, 12 'ride' up ramps 29 and 26 as shown in FIGS. 5A and 5B. As the ears 15, 12 reach the planar top side of their respective ramps 29, 26 during rotation of the assembly as indicated in FIG. 5A by arrow C, the chamfered edge of each locking tab 22 (as shown in FIG. 5B) deflects upward upon contact with a top portion of mounting ears 15 (arrow C' of FIG. 5B).

Figure 6A:
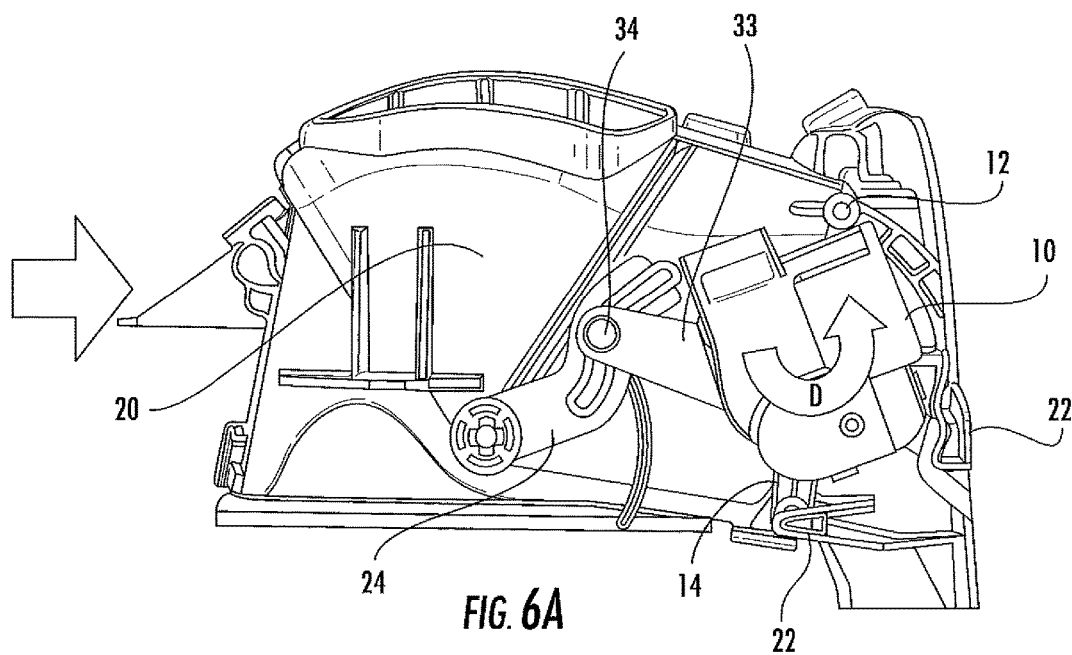
FIG. 6A is a partial overhead view of the servo assembly securing means during the fourth step of attachment to the HVAC housing.
Figure 6B:
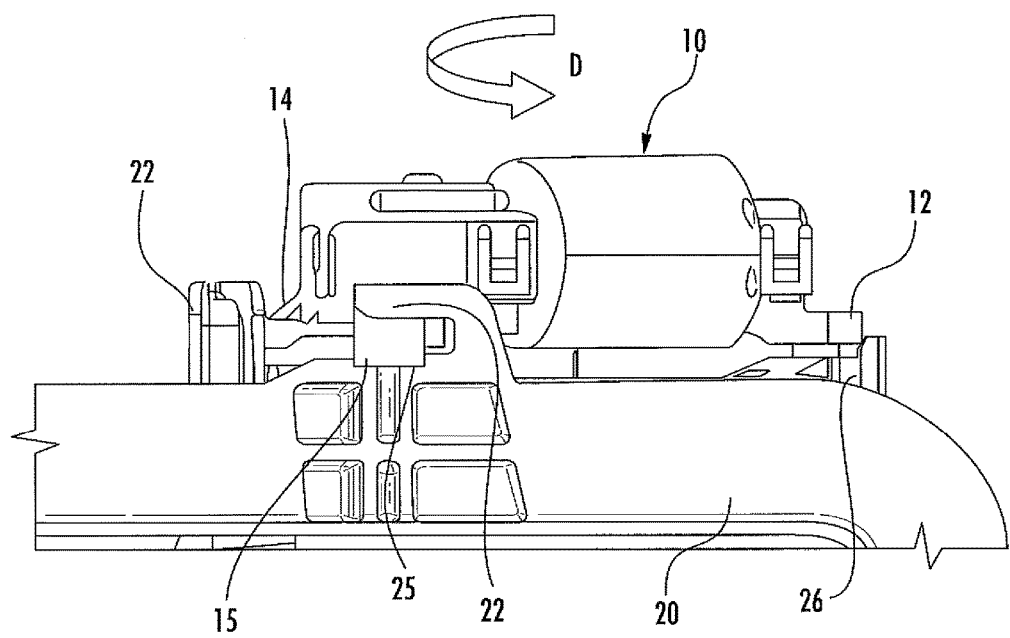
FIG. 6B is a partial side view of the servo assembly securing means during the fourth step of attachment to the HVAC housing.

As assembly 14 is continued to be rotated counterclockwise as shown by arrow D in FIG. 6A, mounting ears 15 slide across the generally planar portion surrounding each recess 25 until the lower portions of the ears 15 are directly over recess' 25, at which time locking tabs 22 reflect back down towards their resting position, thereby biasing and locking the lower portions of ears 15 into recess' 25. At this time third attachment ear 12 is now positioned upon the generally planar surface atop ramp 26 accordingly and apertures 13 of third attachment ear 12 is aligned vertically with aperture in HVAC housing 20 atop ramp 26.

At this time, the servo assembly 14 is fully locked into position, and considered attached to the HVAC housing 20. In a further embodiment wherein the specific vehicle application allows, a fastener may be subsequently inserted through aperture 13 of ear 12 into the corresponding aperture in HVAC housing atop ramp 26 for additional security.

Although no additional fasteners or fastener are required for the fastener-less mounting ears 15 to be retained by locking tabs 22, in the event that one or more locking tabs 22 breaks off, due to mishandling during installation, or servicing, the servo assembly 14 may still be attached to the HVAC housing 20 without replacing the entire HVAC assembly housing. In this instance, servo assembly 14 may be further mechanically fastened to the HVAC housing 20 by means of a fastener such as screw, bolt or pin (not illustrated) inserted through aperture 16 of ear 15, and secured into the cavity 28 defined by walls 27 as illustrated in FIG. 2. This is not the intended means of securing the servo assembly 14 to the HVAC housing 20 as described in this disclosure, and would require removal of the HVAC housing 20 from the vehicle, but provides an alternative attachment means without the need to replace the entire HVAC housing.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. For example, the primary embodiment disclosed two fastener-less locking ears, but the servo assembly 14 may have any number of fastener-less attachment ears greater than one, and may comprise the sole means of attaching the servo assembly to the HVAC housing. Such variations are not to be regarded as a departure from the invention, and all such modifications are intended to be included within the scope of the invention. For the purpose of this disclosure, the term fastener can mean any type of fastener known in the art such as pins, screws, bolts or the like comprised of materials such as metals, alloys, polymers, or plastics known in the art.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the Figures. Spatially relative terms may be intended to encompass different orientations of the device in use or operation in addition to the orientation depicted in the Figures. For example, if the device in the Figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An automotive HVAC assembly comprising:
    an HVAC housing having an internal side and an external side, at least one controllable door located on the internal side and at least one door linkage and at least one servo assembly attachment position located on the external side;
    a servo assembly attached to the external side of the HVAC housing, the servo assembly having a servo motor, a servo arm for actuating the linkage, and an attachment means for attaching the servo assembly to the HVAC housing, wherein;
    the attachment means comprises at least first and second attachment ears which detachably attach in a locking manner to deflectable locking tabs of a servo assembly attachment structure to prevent further rotational, vertical, or horizontal movement of the servo assembly with respect to the HVAC housing.

2. The HVAC assembly set forth in claim 1, wherein each locking tab is positioned above a recess in the HVAC housing which receives a lower portion of each fastener-less attachment ear in a locking engagement.

3. The HVAC assembly set forth in claim 2, wherein said locking tabs are generally J-shaped, and are oriented generally coplanar to the surface of the HVAC housing.

4. The HVAC assembly set forth in claim 2, wherein said at least first and second fastener-less attachment ears are rotatably received within the at least two locking tabs.

5. The HVAC assembly set forth in claim 4, wherein said servo assembly further comprises a pivot pin extending through the servo arm, the pivot pin being received in a pivot pin recess in the attachment position of the HVAC housing prior to the first and second attachment ears being rotatably received within the locking tabs.

6. The HVAC assembly set forth in claim 2, wherein said attachment position further comprises at least one ramp on the HVAC housing proximal each locking tab which guides each attachment ear under each locking tab.

7. The HVAC assembly set forth in claim 1, wherein said servo assembly comprises a third attachment ear, the third attachment ear attaching to the HVAC housing with a fastener after the first and second attachment ears are received within the locking tabs.

8. A method of attaching a servo assembly to an external side of a HVAC housing without additional fasteners comprising;
    providing an HVAC housing having at least one external door linkage and one servo assembly attachment structure located on the external side, the attachment structure having at least one locking tab and one pivot pin recess defining a pivot axis;
    providing a servo assembly for attaching to the attachment structure, the servo assembly having a pivot pin positioned through a servo arm having a servo arm pin, and the servo assembly further having at least one attachment ear, the attachment ear having a lower portion extending downward towards the HVAC housing; and
    inserting the pivot pin into the pivot pin recess, inserting the servo arm pin into the door linkage, and rotating the servo assembly around the pivot axis coplanar to the external side of the HVAC housing until the at least one attachment ear is received and locked into position within the at least one locking tab.

\* \* \* \* \*